Jan. 2, 1968   R. J. PURTELL   3,361,364
CROP-GUARD FOR AGRICULTURAL IRRIGATION SPRINKLERS
Filed July 14, 1965   2 Sheets-Sheet 1
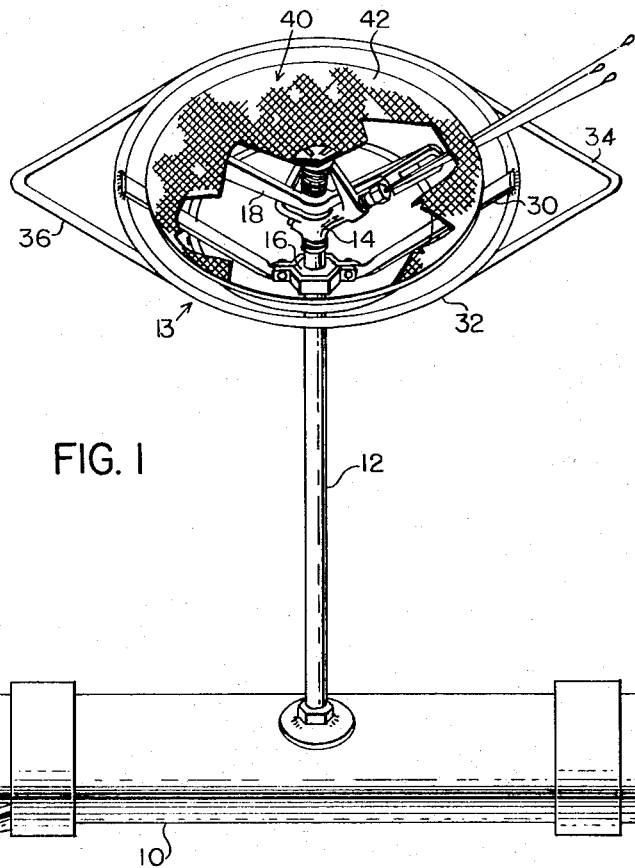
FIG. 1
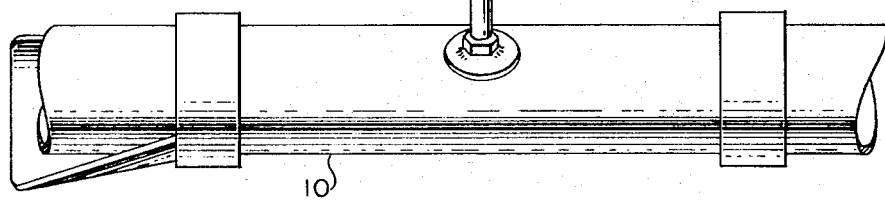
FIG. 2
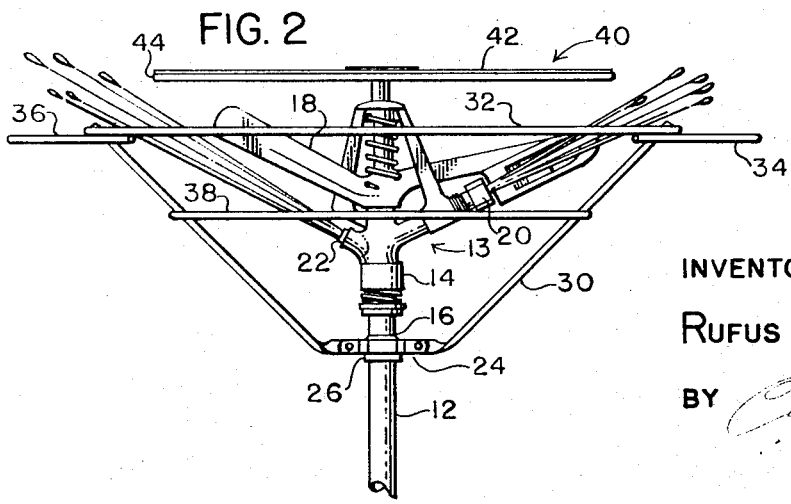
INVENTOR
Rufus J. Purtell
BY Jan. 2, 1968   R. J. PURTELL   3,361,364
CROP-GUARD FOR AGRICULTURAL IRRIGATION SPRINKLERS
Filed July 14, 1965   2 Sheets-Sheet 2

INVENTOR
Rufus J. Purtell

United States Patent Office 3,361,364
Patented Jan. 2, 1968

3,361,364
CROP-GUARD FOR AGRICULTURAL
IRRIGATION SPRINKLERS
Rufus J. Purtell, Brownfield, Tex., assignor to The J. B. Knight Co., Inc., Brownfield, Tex, a corporation of Texas
Filed July 14, 1965, Ser. No. 471,884
3 Claims. (Cl. 239—288.5)

ABSTRACT OF THE DISCLOSURE

Guard rings are attached around an agricultural sprinkler to prevent growing crops from fouling the sprinkler as it is dragged through a field. The top ring is above the sprinkler and has points on it to part the crop. A disc may be attached above the sprinkler leaving an annular space for the jet of water.

---

This invention relates to a mobile agricultural sprinkler irrigation system and more particularly to a guard for a sprinkler to prevent the sprinkler from becoming fouled by growing crops as the system is moved from one location to another.

In many irrigation systems in use today a sprinkler is mounted at a low level on a riser on top of a conduit which is moved through the field being irrigated. If the growing crops are higher than the sprinkler, the leaves and stalks of the growing crop tend to catch on the sprinkler fouling it.

This problem has been recognized and a solution sought in U.S. Patent No. 2,973,148 to Franz. I have found that it is desirable to provide the guard at a point which is above the nozzles of the sprinkler and level with or above the rotating mechanism of the sprinkler. It is possible to construct a guard having this quality if it is made of large enough diameter. The nozzles discharge a jet of water from the sprinkler in a circular pattern which increases in diameter with height, at least close to the sprinkler. Therefore the ring can be placed above the entire sprinkler provided it has a diameter greater than the diameter of the circle of the jet of water at that height.

With the first ring placed at such height it is sometimes desirable to place a second ring therebelow. Furthermore I have sometimes found that it is beneficial to place a point on the first ring to divide the crop as the system is moved along.

Furthermore it is often desirable to place a disc above the sprinkler to prevent debris from falling from above onto the sprinkler.

An object of this invention is to provide a guard for preventing a sprinkler from becoming fouled as it is moved through a growing crop.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and does not require skilled people to operate.

The specific nature of the invention as well as other objects, uses, and advantages thereof will clearly appear from the following description and from the accompanying drawing, the different views of which are not necessarily to the same scale, in which:

FIG. 1 is a perspective view of the invention mounted on sprinkler, riser, and conduit with parts broken away for clarity.

FIG. 2 is a side elevation of the invention also showing the sprinkler and part of the riser.

Figure 3:
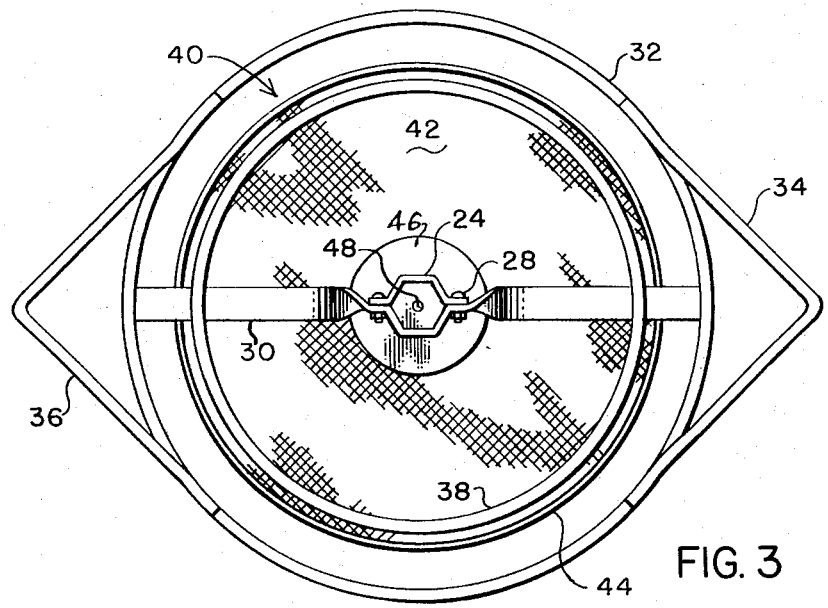
FIG. 3 is a bottom view of the invention.

Referring more specifically to the drawing it may be seen there illustrated conduit 10 which is adapted to carry water under pressure and is further adapted to be moved by sliding axially through the field to be irrigated. The conduit has a plurality of risers 12 attached to it although only one is shown in the drawing.

Sprinkler 13 is attached to the top of the riser 12. The sprinkler has an upper portion 14 which is mounted for rotation about its axis on the lower portion 16 which is attached to the riser 12. The upper portion 14 is rotated by mechanism 18 responsive to flow of water through the sprinkler. The water flows through the sprinkler through nozzles 20 and 22. It will be seen that each of these nozzles is angled upward so that they discharge a jet of water therefrom upward and outward. The nozzles 20 and 22 are located upon the upper portion 14. Therefore it may be seen that the jets of water form circles as they are discharged from the rotating upper portion 14. This circle of water discharged from the nozzles will be greater in diameter at greater heights, at least in the vicinity of the sprinkler 13.

It will be understood that those items which have been discussed and described above are old and well known and except in combination with the guard described below form no part of this invention by themselves.

The guard has means for attaching it to the lower portion of the sprinkler which includes clamp 24 which is adapted to attach to hexagonal nut 26 by which the lower portion 16 is attached to the riser 12. The clamp is hexagonal in cross section itself therefore adapted to fit the hexagonal nut. It is split and the two portions are held together by screws 28 (FIG. 3). Two struts 30 extend upward and outward from one half of the clamp 24. First or upper ring 32 is attached to the top of the struts 30. The struts 30 and clamp 24 form the means for attaching the first ring 32 to the lower portion 16 of the sprinkler 13.

The ring 32 is concentric with the sprinkler 13 and is formed of a heavy wire and therefore it is stiff. The ring 32 is above the nozzles 20 and 22. Careful examination of the drawings will reveal that the top of the ring 32 is level with or above the means or mechanism 18 for rotating the upper portion 14 of the sprinkler. Therefore the first ring 32 is adapted to protect the sprinkler from debris. The ring is not exactly circular in shape but has points 34 and 36 which are aligned with the conduit 10. The purpose of these points are to part the growing crops to one side or the other of the guard as the conduit is moved through a field of growing crops.

Second ring 38 is mounted on the means for attaching the first ring, i.e. struts 30. It likewise is made of stiff wire and is concentric with the sprinkler. It is of smaller diameter than the ring 32 and mounted below the ring 32. It also aids in preventing the leaves or stems or stalks of growing crops from fouling the sprinkler 13.

As the sprinkler is moved along sometimes leaves or stems or blooms or seed will be shaken loose from the plants above the sprinkler 13 and fall onto the top of the sprinkler and foul the sprinkler. Therefore I have provided a disc 40 which is attached to the top of the upper portion 14 of the sprinkler. Preferably the disc 40 is constructed of a circular screen 42 which is stiffened along its perimeter by stiff wire 44. The center of the disc 40 is formed by sheet metal disc 46 which has a hole 48 through the center.

Figure 4:
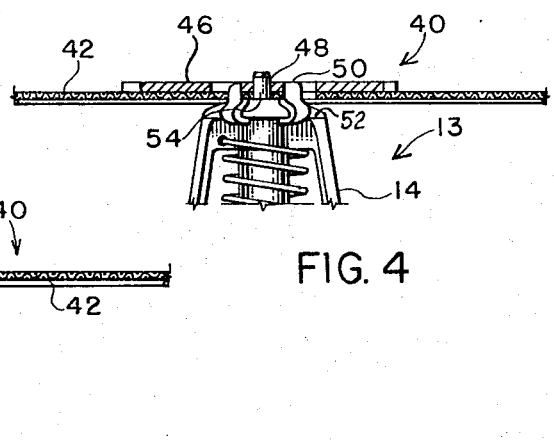
FIG. 4 is a side view of one means of attaching of the top disc to the top of the sprinkler, partly in section.

To either side of the hole 48 tabs 50 are struck from the sheet metal 46 and are bent down (FIG. 4). Then these tabs are bent underneath the edges of plate 52 upon the top of the upper portion 14 of the sprinkler 13. Shaft 54 extending from the top of the upward portion 14 of the sprinkler 13 extends through the hole 48. Therefore it may be seen that the disc 46 rotates with the upper portion of the sprinkler.

The disc 40 is of a smaller diameter than the upper ring 32 and is located above it. It is important that the disc 40 be of smaller diameter than the diameter of the circle of the jets of water at this height. Therefore it may be seen that there is an annular opening between the ring 32 on the outside and disc 40 on the inside. The jets of water are discharged from the sprinkler 13 through this annular opening.

Thus the sprinkler is well guarded and protected from being fouled by debris from the growing crops by my invention.

Figure 5:
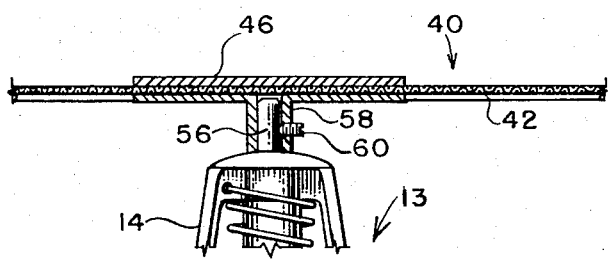
FIG. 5 is a detailed view of another means of attaching the top disc to the top of the sprinkler, partly in section.

An alternate method for attaching the disc 40 to the top of the sprinkler is illustrated in FIG. 5. On some models of the sprinkler shaft 56 from the top center of the sprinkler 13 extends upward sufficiently so that a collar 58 may be attached to the bottom of the center sheet metal disc 46. Radial set screw 60 extends through the collar 58 and thus attaches the disc 40 to the upper portion 14 of the sprinkler 13.

It will be apparent that the embodiments shown are only exemplary and that various modifications can be made in construction, materials, and arrangement within the scope of the invention as defined in the appended claims.

I claim as my invention:

1. On an irrigation system including
   (a) a conduit adapted to carry water under pressure and adapted to be moved by sliding axially along the ground of the field to be watered,
   (b) a riser fluidly connected to the conduit and extending upward, and
   (c) a sprinkler on top of the riser, said sprinkler having
      (i) an upper rotatable portion,
      (ii) a lower portion attached to the riser,
      (iii) means for rotating the upper portion of the sprinkler on the lower portion responsive to flow of water therethrough, and
      (iv) at least one nozzle on the upper rotatable portion,
      (v) said nozzle angled upward to discharge a jet of water upward and outward from the sprinkler,
      (vi) said jet of water forming a circle as the upper portion of the sprinkler rotates, the improved guard to prevent growing crops from fouling the sprinkler as it is moved with the conduit comprising in combination with the above:
   (d) a stiff first ring concentrically surrounding the sprinkler,
   (e) said ring being above the nozzles and
   (f) said ring being of greater diameter than the diameter of the circle of jet of water at that height, and
   (g) means for attaching said first ring to the lower portion of said sprinkler,
   (h) said ring having a point on one side,
   (j) said point aligned with said conduit.

2. The invention as defined in claim 1 wherein
   (k) said ring having two diametrically opposed points,
   (m) said points aligned with said conduit.

3. On an irrigation system including
   (a) a conduit adapted to carry water under pressure and adapted to be moved by sliding axially along the ground of the field to be watered,
   (b) a riser fluidly connected to the conduit and extending upward, and
   (c) a sprinkler on top of the riser, said sprinkler having
      (i) an upper rotatable portion,
      (ii) a lower portion attached to the riser,
      (iii) means for rotating the upper portion of the sprinkler on the lower portion responsive to flow of water therethrough, and
      (iv) at least one nozzle on the upper rotatable portion,
      (v) said nozzle angled upward to discharge a jet of water upward and outward from the sprinkler,
      (vi) said jet of water forming a circle as the upper portion of the sprinkler rotates, the improved guard to prevent growing crops from fouling the sprinkler as it is moved with the conduit comprising in combination with the above:
   (d) a stiff first ring concentrically surrounding the sprinkler,
   (e) said ring being above the nozzles and
   (f) said ring being of greater diameter than the diameter of the circle of jet of water at that height,
   (g) means for attaching said first ring to the lower portion of said sprinkler,
   (h) said ring has two diametrically opposed points,
   (j) said points aligned with said conduit,
   (k) a second ring smaller in diameter than the first ring,
   (m) the second ring attached below the first ring to said means for attaching said first ring,
   (n) a disc concentrically attached to the top of the upper portion of the sprinkler,
   (o) said disc not greater in diameter than said first ring,
   (p) said disc smaller in diameter than the diameter of the circle of jet of water at that height, and
   (q) said disc above said first ring.

References Cited
UNITED STATES PATENTS

| | | | |
|---|---|---|---|
| 998,126 | 7/1911 | Sherk | 239—288.5 X |
| 1,075,053 | 10/1913 | Moore | 239—288.5 X |
| 2,417,222 | 3/1947 | Stine | 239—288.5 X |
| 2,535,766 | 12/1950 | Wahlin | 239—288.5 |
| 2,757,045 | 7/1956 | Nullet | 239—288.3 X |
| 2,973,148 | 2/1961 | Franz | 239—230 |

OTHER REFERENCES

Roto-Skid pamphlet, Texas Safety Supply Co., 4 pages, Apr. 21, 1964.

M. HENSON WOOD, Jr., *Primary Examiner.*

V. C. WILKS, *Assistant Examiner.*